(12) United States Patent
Otto

(10) Patent No.: US 9,205,992 B2
(45) Date of Patent: Dec. 8, 2015

(54) CONVEYOR FOR CONVEYING HANGING OBJECTS

(71) Applicant: Thomas Otto, Bielefeld (DE)

(72) Inventor: Thomas Otto, Bielefeld (DE)

(73) Assignee: SDI GROUP GERMANY MATERIAL HANDLING, Bielefeld (DE)

( * ) Notice: Subject to any disclaimer, the term of this patent is extended or adjusted under 35 U.S.C. 154(b) by 0 days.

(21) Appl. No.: 14/229,067

(22) Filed: Mar. 28, 2014

(65) Prior Publication Data

US 2015/0175358 A1     Jun. 25, 2015

(30) Foreign Application Priority Data

Dec. 23, 2013   (EP) .................................. 13199375

(51) Int. Cl.
| | |
|---|---|
| *B65G 17/42* | (2006.01) |
| *B65G 19/02* | (2006.01) |
| *B65G 47/61* | (2006.01) |
| *B65G 9/00* | (2006.01) |
| *B65G 17/20* | (2006.01) |

(52) U.S. Cl.
CPC .............. *B65G 17/42* (2013.01); *B65G 9/008* (2013.01); *B65G 17/20* (2013.01); *B65G 19/025* (2013.01); *B65G 47/61* (2013.01); *B65G 2201/0229* (2013.01)

(58) Field of Classification Search
CPC ........ B65G 47/61; B65G 17/20; B65G 17/42; B65G 9/008; B65G 19/025; B65G 2201/0229
USPC ....................................................... 198/465.4
See application file for complete search history.

(56) References Cited

U.S. PATENT DOCUMENTS

| | | | | |
|---|---|---|---|---|
| 2,946,427 | A * | 7/1960 | Friedman ....................... | 198/359 |
| 3,403,767 | A * | 10/1968 | Gerisch ......................... | 198/360 |
| 4,977,996 | A * | 12/1990 | Duce ........................ | 198/349.95 |
| 5,433,154 | A * | 7/1995 | Chwalik et al. ............ | 104/172.4 |
| 6,991,090 | B2 * | 1/2006 | Gaertner ....................... | 198/680 |
| 8,505,712 | B2 * | 8/2013 | Andreae et al. ............. | 198/678.1 |
| 2003/0000806 | A1 | 1/2003 | Gartner | |
| 2005/0121292 | A1 * | 6/2005 | Braunmuller .............. | 198/465.4 |

FOREIGN PATENT DOCUMENTS

| | | |
|---|---|---|
| EP | 1 258 439 | 11/2002 |
| EP | 1 531 133 | 5/2005 |
| EP | 1 690 811 | 8/2006 |

* cited by examiner

*Primary Examiner* — Gene Crawford
*Assistant Examiner* — Keith R Campbell
(74) *Attorney, Agent, or Firm* — Henry M. Feiereisen LLC

(57) ABSTRACT

A conveyor for conveying hanging objects has a first rail profile with an upper track and a another track arranged below the upper track, a conveyor chain movable in the first track, holding adapters for holding objects to be conveyed, wherein the holding adapters can be coupled and decoupled from the conveyor chain during movement of the conveyor chain, the first rail profile having a sorting section with a separation unit and a switch following in conveying direction, the second track in the region of the sorting section being configured as downward slope in conveying direction, in which the distance between the upper track and the other track increases so that the holding adapters and the conveyor chain are decoupled from each other, wherein the separation unit and the switch are arranged in a region of the sorting section at which the holding adapters are decoupled from the conveyor chain.

10 Claims, 7 Drawing Sheets

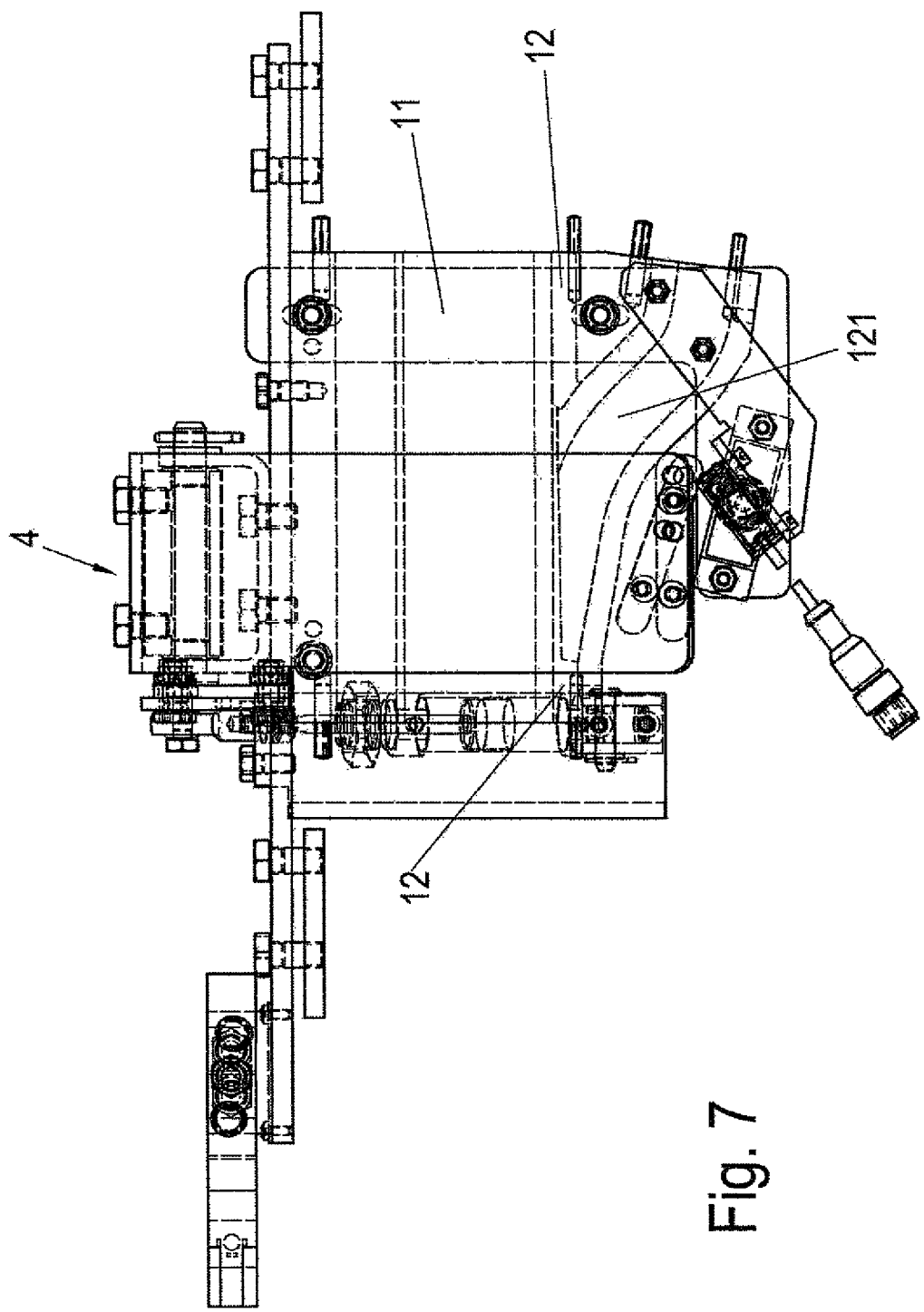

CONVEYOR FOR CONVEYING HANGING OBJECTS

CROSS-REFERENCES TO RELATED APPLICATIONS

This application claims the priority of European Patent Application, Serial No. 13 199 375.0, filed Dec. 23, 2013, pursuant to 35 U.S.C. 119(a)-(d), the disclosure of which is incorporated herein by reference.

BACKGROUND OF THE INVENTION

The present invention relates to a conveyor for conveying hanging objects.

The following discussion of related art is provided to assist the reader in understanding the advantages of the invention, and is not to be construed as an admission that this related art is prior art to this invention.

Generic conveyers which serve for conveying hanging objects and are also referred to as overhead twin rail chain conveyors or power and free conveyers, essentially are formed by a rail profile, in which a conveyor chain is guided in an upper track, and a second track which is arranged below this upper track and in which holding adapters are guided which are carried along by the conveyor chain in conveying direction.

In order to stop an object to be conveyed in such a conveyor, it is not the conveyor chain that is stopped but rather the holding adapter for example by means of a stopping device, and is thereby decoupled from the conveyor chain, wherein the conveyer chain continues to move.

In order to select (sort out) individual objects hanging on the holding adapters, from such a conveyor, all holding adapters with objects hanging thereon have to be transferred into a sorting conveyor in which the holding adapters, and with this the objects to be conveyed, are coupled at defined distances to each other. In the sorting conveyor the objects to be sorted out are then identified and are conveyed out of the sorting conveyor to a packing site or the like. While hanging on the holding adapters, the remaining objects are subsequently conveyed back again into the overhead twin rail chain conveyor which is used as storage circle, rendering sorting out of desired objects very time consuming. In particular, depending on the circumstance, the objects to be sorted out have to be moved through the overhead twin rail chain conveyor which is used as storage circle, in order to reach the site of the conveyor at which the object can be transferred into a sorting conveyor.

It would therefore be desirable and advantageous to provide an improved conveyor in which residence time in the conveyor is decreased and with this individual conveyed objects can be sorted significantly faster.

SUMMARY OF THE INVENTION

According to one aspect of the present invention, a conveyor for conveying hanging objects includes a first rail profile having an upper first track, a second track arranged below the first track, and a sorting section with a separation unit and a switch, wherein the switch follows the separation unit in a conveying direction; a conveyor chain constructed for continuous movement in the first track of the first rail profile in the conveying direction; holding adapters for holding objects to be conveyed, each holding adapter having a head part rollably supported in the second track of the first rail profile, each holding adapter is constructed for being coupled and decoupled from the conveyor chain during movement of the conveyor chain, wherein the second track in a region of the sorting section is configured as downward slope in the conveying direction, wherein in the downward slope a distance between the first track and the second track increases to a degree at which the holding adapters and the conveyor chain are decoupled from each other, and wherein the separation unit and the switch are arranged in a region of the sorting section at which the holding adapters are decoupled from the conveyor chain.

With such a conveyor, a sorting section can be integrated into a conveyor which is configured as overhead twin rail chain conveyor, which is made possible by the fact that the holding adapters pass through the sorting section in a state of being decoupled from the conveying chain, without impeding, in particular without slowing down, the circulation of the remaining holding adapters which are guided in the conveying device, and with this the objects conveyed on the holding adapters.

The sorting out of individual objects hanging on the holding adapters is thus possible in a significantly shorter time than in conventional conveyors in which the objects to be sorted out first have to be transferred out of an overhead twin rail chain conveyor, which serves as buffer storage, into a sorting circuit in which the objects or respectively the holding adapters are engaged in the conveyor chain at defined distances to each other, in order to read out the information which is for example arranged on a holding adapter at relates to the object conveyed on the holding adapter, to switch the subsequent switch correspondingly and in this way be able to sort out the desired objects or return the desired objects back into the buffer circuit.

According to an advantageous embodiment of the invention, the first rail profile can be configured as closed circuit profile, wherein a second rail profile and a third rail profile follow in conveying direction behind the switch, wherein the second rail profile with a track for receiving and conveying the holding adapters follows the second track of the first rail profile and leads into a reintegration section of the first rail profile, and wherein the third rail profile follows the second track of the first rail profile for conveying the holding adapters to a further conveyor.

Providing such a second track for returning the holding adapters into the first rail profile, enables a reliable and backlog-avoiding return of the holding adapters into the first rail profile which preferably extends in a plane.

According to a further preferred embodiment of the invention, the second track can be configured in the region of the reintegration section as incline in conveying direction, wherein in the reintegration section the distance between the first track and the second track of the first rail profile decreases from a degree where the holding adapters and the conveying chain are not coupled with each other to a degree where the holding adapters and the conveying chain can be coupled with each other.

For conveying the holding adapters in the second rail profile, a further conveyor is provided parallel to the second rail profile in a further embodiment of the invention, which further conveyor is in particular provided as chain drive with fingers which engage in the head of the holding adapters for conveying the holding adapters in the further conveyor.

These fingers of the further conveyor are preferably configured elastic. This makes it possible that even when a finger accidentally impacts a side region of the holding adapter, the finger is deflected elastically to the left or right hand side in order to thereby, depending on the direction of deflection, either engages behind the respective holding adapter and further conveys this holding adapter or is deflected in conveying direction before the holding adapter so that the holding adapter is carried along by the next finger of the conveyor.

According to a further advantageous embodiment of the invention, a speed control section adjoins in conveying direction before the stopping device, with an detection device for detecting a number of adapters present in the speed control section, wherein when the number of adapters falls below a predetermined number the detection device outputs a control signal to a drive unit of the conveying chain for increasing the conveying speed of the conveyor chain. This enables a capacity controlled speed control of the conveyor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 is a perspective view of the rail profile in the region of the separation unit and FIG. 7 is a side view of the section shown in FIG. 6 of the rail profile showing the downward slope.

DETAILED DESCRIPTION OF PREFERRED EMBODIMENTS

Figure 1:
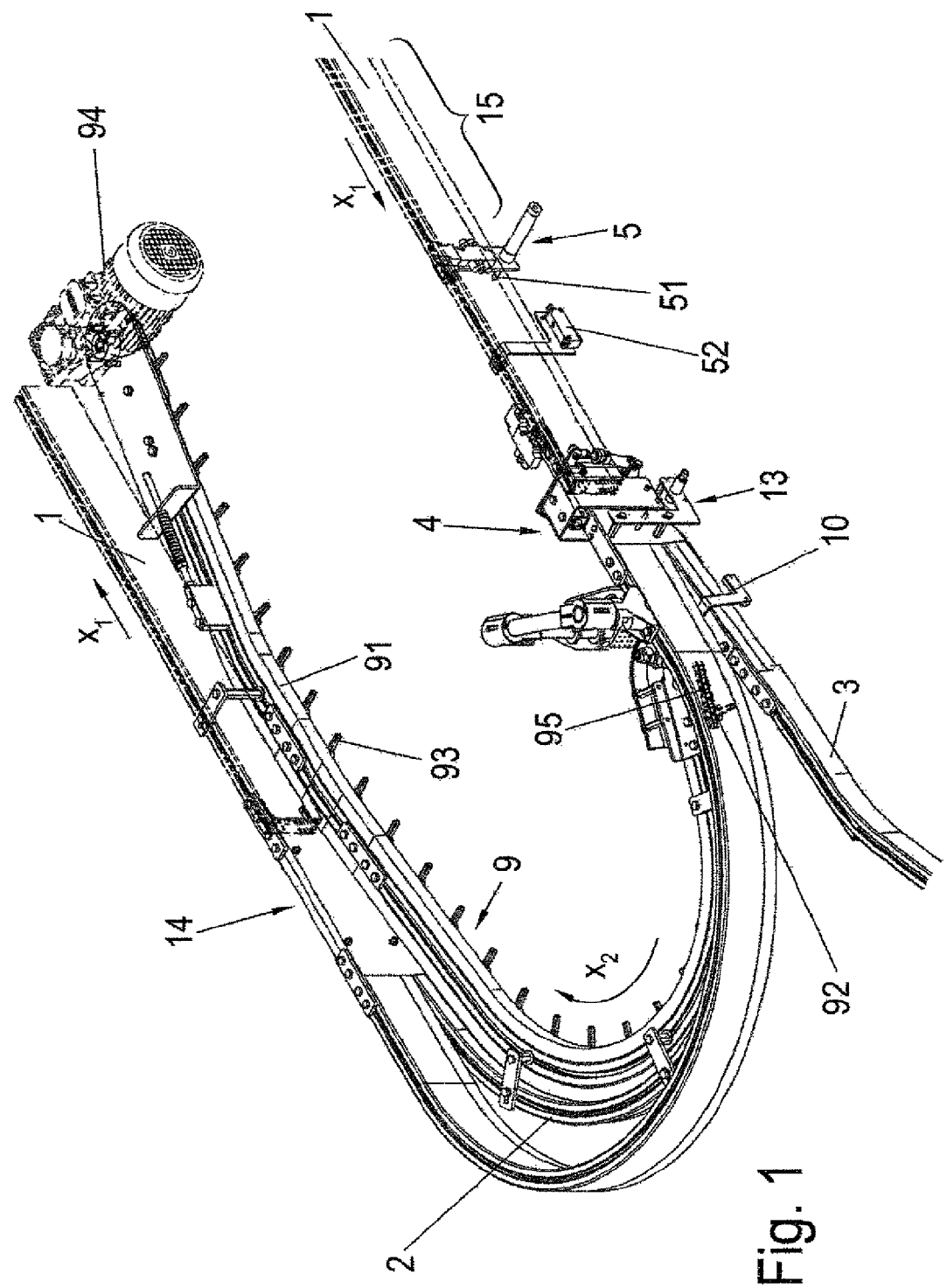
FIG. 1 is a perspective view onto an embodiment of a conveyor according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the following description of the Figures the terms up, down, left, right, front, rear etc, exclusively refer to the exemplary representation and position of the conveyor, rail profile, track, conveyor chain, holding adapter and the like chosen in the Figures. These terms are not to be understood as limiting, i.e., the relationships may change as a result of different operating positions or the mirror symmetrical layout or the like.

In FIG. 1 reference numeral 1 designates a first rail profile of a conveyor for conveying hanging objects. In this first rail profile 1 a conveyor chain 7 is guided in a first upper track 11. The conveyor chain 7 is configured as so called Power and Free chain, with a thrust body 63 which is vertically elastically arranged below a base body 62 of a respective chain link, which thrust body has at least one recess for form fittingly receiving a coupling member of a head part 61 of a holding adapter 6. The base body is provided with lateral friction roller abutment surfaces, onto which the (not shown) friction rollers can be pushed for driving the conveyor chain 7, in order to move the conveyor chain 7 in a conveying direction $x_1$ in the rail profile 1. The construction of such a conveyor chain 7 is described in the German patent application DE 10 2013 100 132, to which reference is made here.

The hanging objects to be conveyed are for example conveyed by means of a bracket which is engaged in a holding adapter 6. The holding adapters 6 have in a second track 12 of the first rail profile 1 a head part 61 which is supported for rolling movement, wherein the head part 61 is shaped so that it can be coupled and decoupled from the conveyor chain 7 while the conveyor chain is moving.

Figure 3:
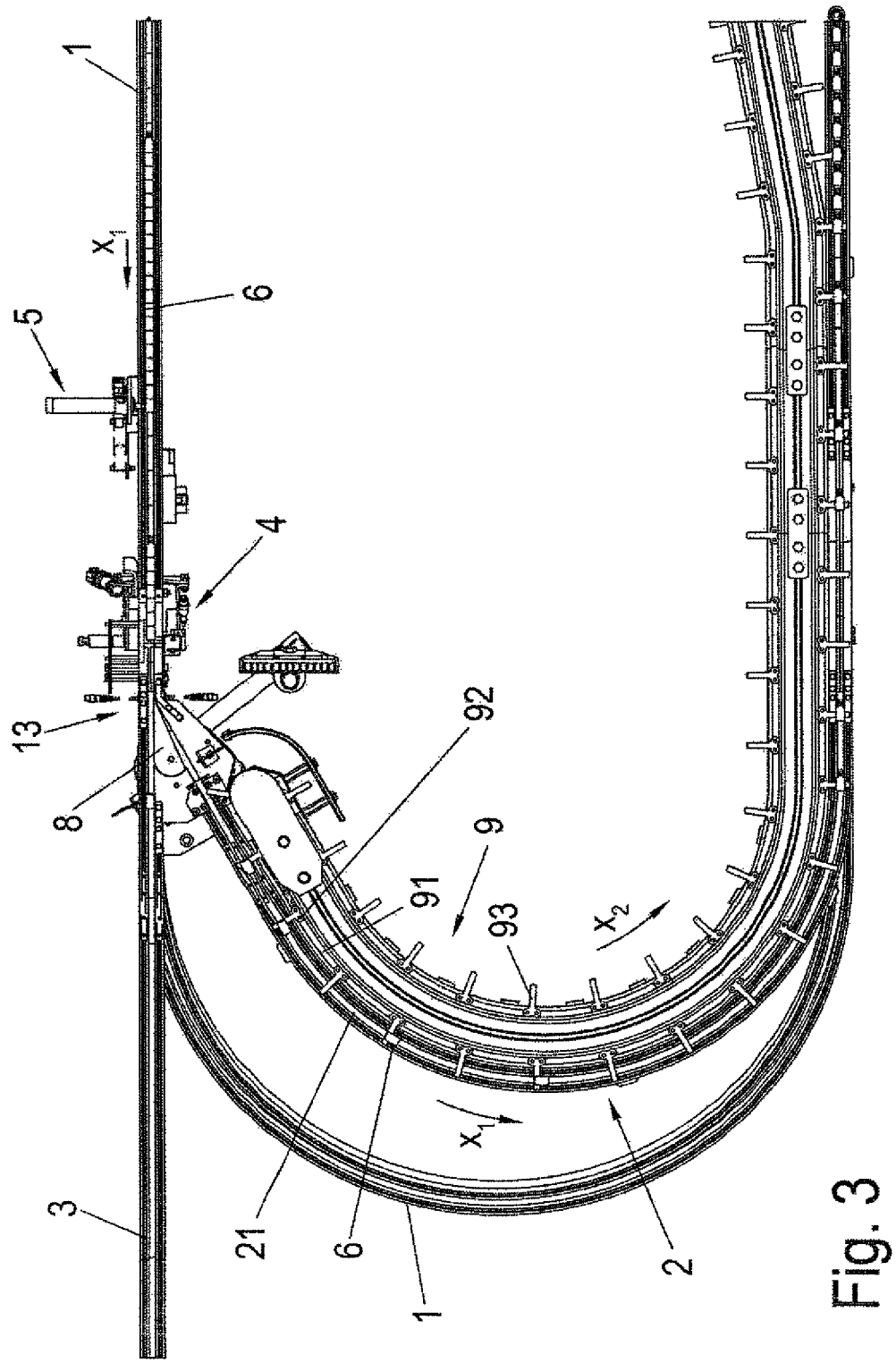
FIG. 3 is a view from below onto the conveyor of FIG. 1.
Figure 4:
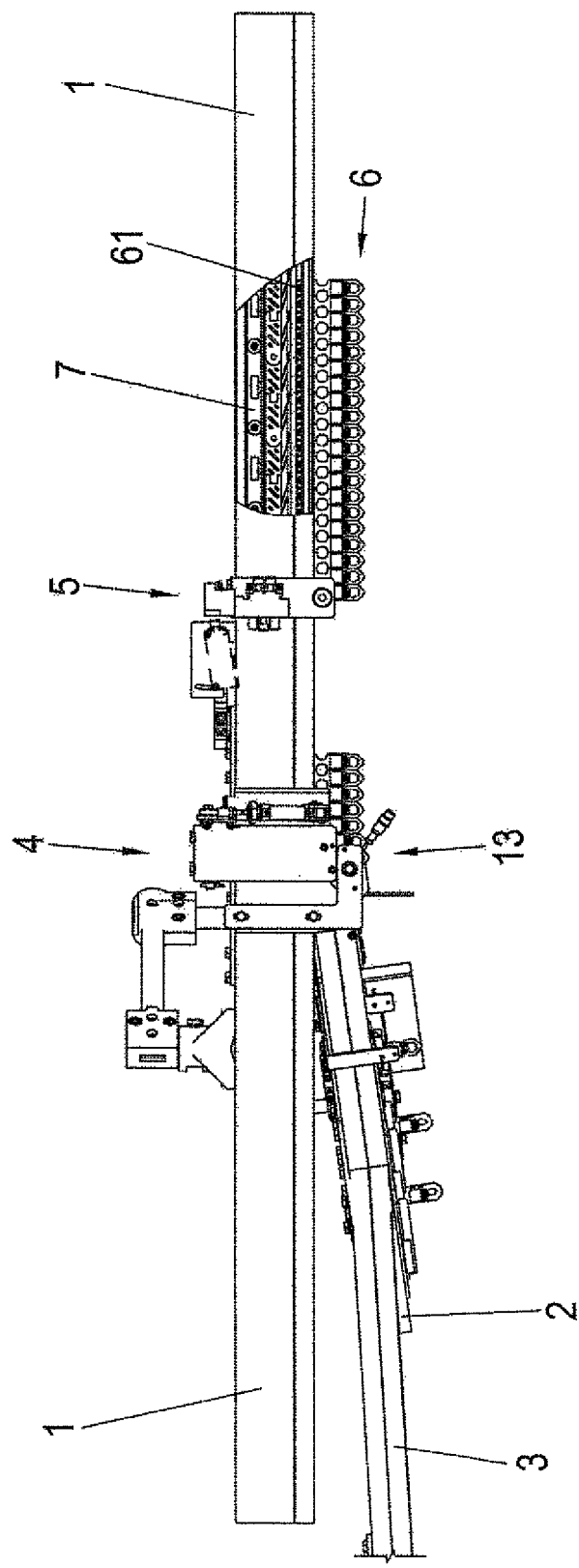
FIG. 4 is a side view onto the conveyor of FIG. 1 showing the sorting section.

In order to sort out individual objects which hang on a particular holding adapter 6 out of the first rail profile 1, the first rail profile 1 has a sorting section 13 with a separation unit 4 and a switch 8 which follows in conveying direction $x_1$, as shown in the view from the bottom onto the first rail profile 1, shown in FIG. 3. Preferably, a stopping device 5 is provided on the first rail profile 1 before the sorting section 13 of the first rail profile 1, in order to only allow a predetermined number of holding adapters 6 to enter immediately downstream of the sorting section 13.

"Behind" the sorting section 13 means a section through which an adapter 6 passes in conveying direction $x_1$, before it reaches the sorting section 13. Correspondingly "before" the sorting section 13 means a section through which an adapter 6 passes in conveying direction $x_1$ after the adapter 6 has passed the sorting section 13.

The stopping device 5 has essentially an electrically controllable blocking bar 51, which is controlled by a detection device 52, for example a light barrier, wherein the detection device 52 determines whether a holding adapter 6 is present at a predetermined position after the detection device 52 or not. When a holding adapter is recognized, the detection device outputs a signal to the stopping device 5, by which the blocking bar 51 of the stopping device 5 is moved into the path of movement of the holding adapter 6 and thus blocks further movement of the holding adapters 6 which approach in conveying direction $x_1$ before the stopping device 5.

The second track 12 is configured in the region of the sorting section 13 as downward slope 121 in conveying direction, shown in FIG. 7, in which the distance D between the first track 11 and the second track 12 increases to a degree at which the holding adapters 6 and the conveyor chain 7 are decoupled from each other.

Due to the downward slope 121 the holding adapters 6 thus move further in conveying direction $x_1$ while being decoupled from the conveyor chain 7. Subsequently the holding adapters 6 move through a reading device, which reads data out of a data storage provided on the holding adapter 6, for example an RFID chip or the like. This enables recognizing whether the switch provided before the reading unit guides the holding adapter 6 out of the rail profile 1 into a rail profile 3 via which the holding adapter 6 and the object hanging on the holding adapter is further guided into a further conveyor. This third rail profile 3 is preferably configured as downward slope so that the adapter with the objects hanging thereon is further conveyed along the third rail profile 3 due to gravity.

When the holding adapter 6 is not to be sorted out of the first rail profile 1, the switch 8 switches and transfers the holding adapter 6 into a second rail profile 2 which adjoins the second 12 of the first rail profile 1 with a track 21 for receiving and further conveying the holding adapter 6, and leads into a reintegration section 14 of the first rail profile 1.

Immediately after the switch 8, a further detection device 10 is provided on both rail profiles 2, 3, for example a light barrier, which controls the separation unit 4 so that when an adapter is recognized to pass the detection device 10 the next adapter which is stopped by the separation unit 4 is released and moves toward the switch 8 in the downward slope 121.

Figure 5:
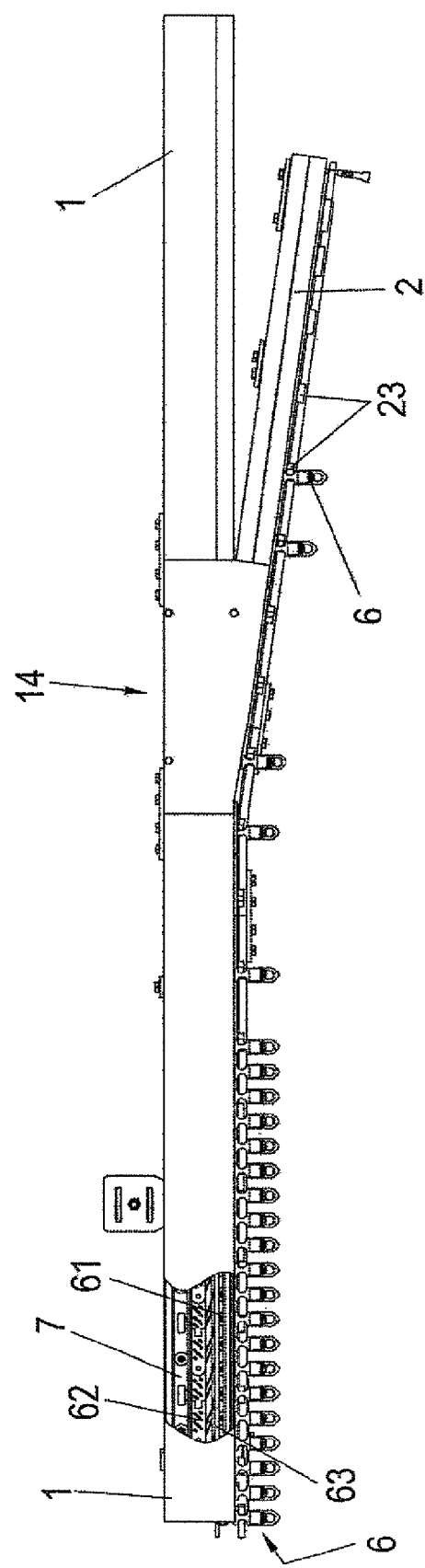
FIG. 5 is a side view onto the conveyor of FIG. 1 with view onto the reintegration section.
Figure 6:
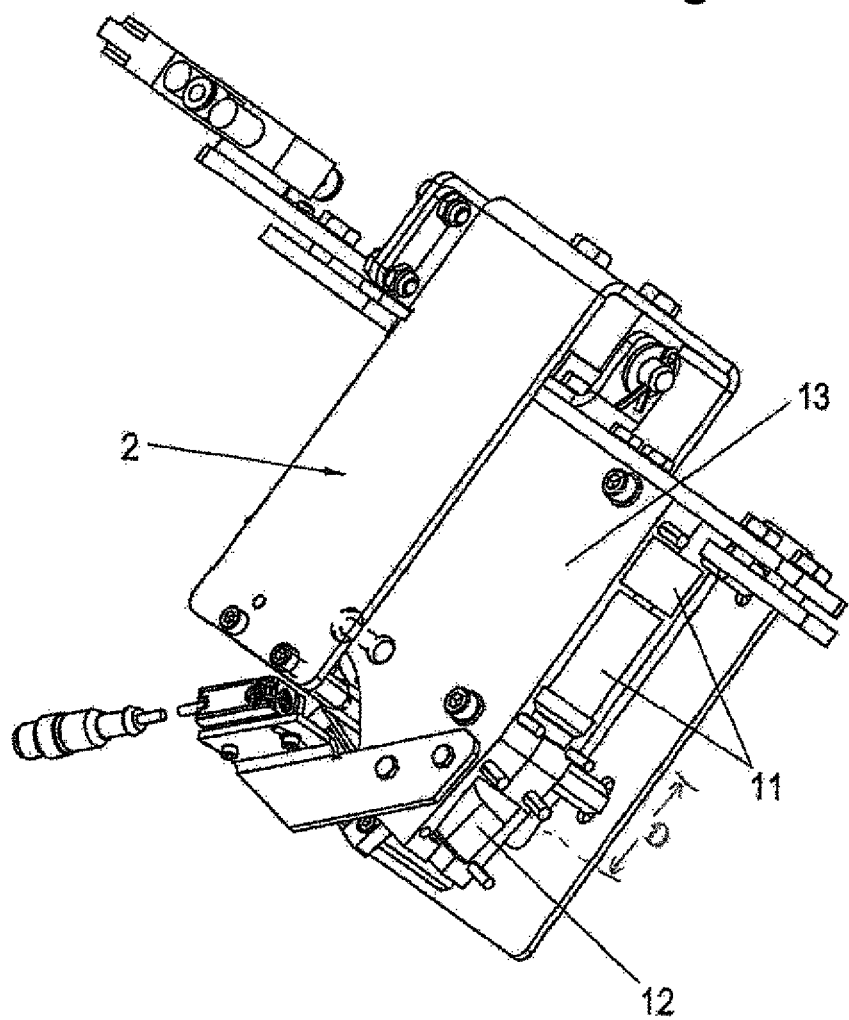

The second track 12 of the first rail profile 1 is configured in the region of the reintegration section 14 preferably as incline 122 in conveying direction $x_1$, as shown in FIG. 5.

In the reintegration section 14 the distance D between the first track 11 and the second track 12 of the first rail profile 1 decreases from a degree at which the holding adapters 6 and the conveyor chain 7 cannot be coupled with each other to a degree at which the holding adapters and the conveyor chain can be coupled with each other, so that the holding adapters 6 after passing through the incline 122 are received again by or coupled again to conveyor chain 7 and thus are further conveyed in the first rail profile 1.

Likewise, other configurations of the reintegration section 14 are conceivable, for example in the form of a horizontally oriented second track 12 of the first rail profile 1, wherein the first track 11, which receives the conveyor chain 7, is configured as downward slope or also in the form of a lateral feed ramp.

The first rail profile 1 is preferably configured as circumferential rail profile 1, so that the holding adapters 6, which are reintegrated into the second track 12 in the reintegration section 14, eventually arrive again before the sorting section 13 of the first rail profile.

Figure 2:
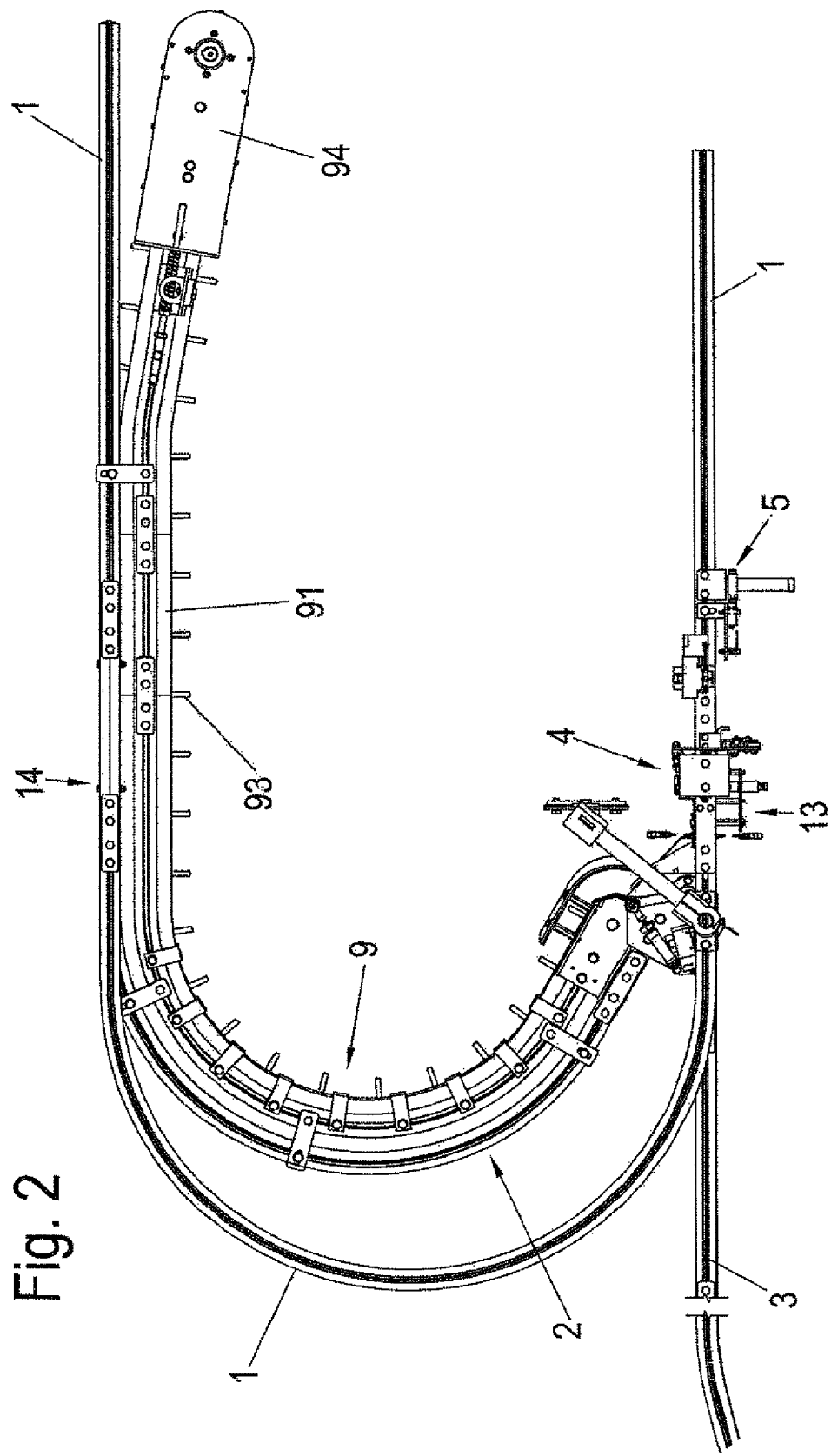
FIG. 2 is a top view onto the conveyor device of FIG. 1.

In order to further convey the holding adapters 6 between the sorting section 13 and the reintegration section 14, a conveyor 9 for further conveying the holding adapters 6 in conveying direction $x_1$ is provided parallel to the second rail profile 2. This conveyor 9, for example shown in the FIGS. 1 to 3, is preferably configured as chain drive with fingers 93 for further conveyance of the holding adapters 6 in conveying direction $x_2$. These fingers 93 are fastened to holding parts 92 which are fixed underneath the chain 95 of the conveyor 9.

The fingers 93, as can be seen in FIGS. 1 to 3, protrude perpendicularly relative to the conveying direction $x_2$ in the direction of the second rail profile 2 and engage for the purpose of conveyance behind the holding adapters 6 and push the holding adapters in conveying direction $x_1$ in the direction toward the reintegration section 14 of the first rail profile 1.

Particularly preferably the fingers 93 are configured elastic. This ensures that even when a finger 93 accidentally collides with a holding adapter 6, whereby surfaces of the holding adapter 6 and the finger 93 contact each other, which surfaces are oriented parallel relative to the conveying direction, the finger 93 can be elastically bent and thus can be deflected before or behind the holding adapter 6 and thereby when being deflected in conveying direction behind the holding adapter 6 further convey the holding adapter 6, or when being deflected before the holding adapter the next finger 93 further conveys the holding adapter 6 to the reintegration section 14.

As also shown in FIG. 1, according to a further preferred embodiment, a speed control section 15 is provided in conveying direction $x_1$ before the stopping device 5, which speed control section 15 is equipped with a further (here not shown) detection device for identifying a number of adapters 6 present in the speed control section 15. With this, a capacity-controlled speed control of the conveyor is possible.

Thus when less than a predetermined number of adapters 6 are detected in the speed control section 15, a control signal is outputted by the detection device to the drive unit of the conveyor chain 7 for increasing the conveying speed of the conveyor chain 7. With this, regions of the conveyor in which only few adapters 6 are present, can be passed through in a shorter time and with the adapters conducted to the sorting section 13 faster and with this the sorting out of desired objects from the conveyor further be shortened.

Correspondingly, according to an embodiment it is provided that when exceeding a predetermined number of adapters 6 a control signal is outputted to the drive unit of the conveyor chain 7 for lowering the conveying speed of the conveyor chain 7. Such an exceeding of the predetermined number can for example occur when in another region of the conveyor a large number of adapters and objects hanging thereon are introduced and/or back up and are then further transported in a tightly packed state.

By lowering or increasing the conveying speed a more uniform distribution of the objects to be conveyed on the conveyor is achieved. This also has the result that the jam pressure of the adapters 6 behind the sorting section 13 due to the almost constant number of adapters 6 remains approximately the same.

The lowering or increasing of the conveying speed also ensures that due to the constant conveying speed of the second conveyor 9 the average distance of the adapters 6 to each other is correspondingly smaller or greater and with this an optimal utilization of the conveyor can be achieved. Thus when the speed of the conveyor chain 7 is reduced, the adapters 6 are urged tighter together in the reintegration section 14 and correspondingly when the speed of the conveyor chain is increased in the reintegration section 14 the adapters 6 are integrated into the second track 12 further spaced apart from each other.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A conveyor for conveying hanging objects, comprising:
a first rail profile having an upper first track, a second track arranged below the first track, and a sorting section with a separation unit and a switch, said switch following the separation unit in a conveying direction;
a conveyor chain constructed for continuous movement in the first track of the first rail profile in the conveying direction;
holding adapters for holding objects to be conveyed, each holding adapter having a head part rollably supported in the second track of the first rail profile, each said holding adapter constructed for being coupled and decoupled from the conveyor chain during movement of the conveyor chain, wherein the second track in a region of the sorting section is configured as downward slope in the conveying direction, wherein in said downward slope a distance between the first track and the second track increases to a degree at which the holding adapters and the conveyor chain are decoupled from each other, and wherein the separation unit and the switch are arranged in a region of the sorting section at which the holding adapters are decoupled from the conveyor chain.

2. The conveyor of claim 1, wherein the first rail profile has a reintegration section and is configured as closed circuit profile, the conveyor further comprising a second rail profile and a third rail profile adjoining in conveying direction before the switch, wherein the second rail profile has another track and adjoins the second track of the first rail profile with the other track for receiving and further conveying the holding adapters, said second rail profile leading into the reintegration section of the first rail profile, said third rail profile adjoining the second track of the first rail profile for further conveying the holding adapters to a further conveyor.

3. The conveyor of claim 2, further comprising a detection device arranged before the switch on the second rail profile and on the third rail profile, constructed for controlling the separation unit.

4. The conveyor of claim 1, further comprising before a stopping device arranged on the first rail profile the sorting section of the first rail profile.

5. The conveyor of claim 1, wherein the second track is configured in the region of the reintegration section as an incline in conveying direction, wherein in the reintegration section a distance between the first track and the second track decreases from a degree which does not allow coupling of the holding adapters and the conveyor chain to each other, to a degree which enables coupling of the holding adapters and the conveyor chain with each other.

6. The conveyor of claim 5, further comprising a further conveyor arranged in a second conveying direction parallel to the second rail profile for further conveying the holding adapters.

7. The conveyor of claim 6, wherein the further conveyor is configured as chain drive with fingers which engage in the head of the holding adapters for further conveying the holding adapters in the second conveying direction.

8. The conveyor of claim 7, wherein the fingers are configured elastic.

9. The conveyor according of claim 1, further comprising a speed control section adjoining in the first conveying direction before the stopping device, said speed control section having a detection device for detecting a number of adapters present in the speed control section, said detection device being constructed to output a control signal to a drive unit of the conveyor chain when less than a predetermined number of adapters are present in the speed control section for increasing a conveying speed of the conveyor chain.

10. The conveyor of claim 9, wherein the detection unit is constructed for outputting another control signal to the drive unit of the conveyor chain for lowering the conveying speed of the conveyor chain when the number of adapters exceeds a predetermined number.

* * * * *